United States Patent [19]
Wakeman et al.

[11] Patent Number: 5,716,001
[45] Date of Patent: Feb. 10, 1998

[54] FLOW INDICATING INJECTOR NOZZLE

[75] Inventors: Russell J. Wakeman, Canton, Mich.; John Bergstrom, Singapore, Singapore

[73] Assignee: Siemens Automotive Corporation, Auburn Hills, Mich.

[21] Appl. No.: 513,058

[22] Filed: Aug. 9, 1995

[51] Int. Cl.$^6$ .................. B67D 5/38; B05B 1/14
[52] U.S. Cl. .............. 239/74; 239/584; 239/590.5; 239/596
[58] Field of Search .............. 239/73, 74, 584, 239/590.5, 596

[56] References Cited

U.S. PATENT DOCUMENTS

| | | | |
|---|---|---|---|
| 4,356,979 | 11/1982 | Dobler | 239/73 |
| 4,545,530 | 10/1985 | Hofmann et al. | 239/73 |
| 4,907,748 | 3/1990 | Gardner et al. | 239/584 |

OTHER PUBLICATIONS

"Silicon Microstructures: Merging Mechanics with Electronics" by Margherita Zanini and Paul Stevenson of Ford Motor Co., Society of American Engineers, Special Publication No. 903, pp. 7–14, 1992.

*Primary Examiner*—Lesley D. Morris
*Attorney, Agent, or Firm*—Russel C. Wells

[57] ABSTRACT

A flow sensing fuel injector nozzle includes first and second spaced silicon layers containing flow restricting and distributing orifices and openings for atomizing fuel. The layers are support by a silicon or metal base and spaced by an epitaxial silicon layer to form a nozzle member. Various electrical conductors and elements formed in the silicon layers and connected with external indicators are operative to indicate the presence and/or the amount of fuel flowing through the injector.

13 Claims, 2 Drawing Sheets

5,716,001

1

FLOW INDICATING INJECTOR NOZZLE

FIELD OF THE INVENTION

This invention relates to engine fuel injectors and more particularly to orifice nozzles used for such injectors.

BACKGROUND OF THE INVENTION

In the art relating to engine fuel injectors, it is known to provide one or more orifice nozzle plates made of silicon for controlling and atomizing fuel flow sprayed from a fuel injector into an associated engine induction system. Representative United States patents are U.S. Pat. Nos. 4,647,013; 4,826,131; and 4,907,748 all of which are assigned to Ford Motor Company. U.S. Pat. 5,286,002 entitled "Fuel Injector Having a Composite Silicon Valve" issued on Feb. 15, 1994, to Bergstrom is assigned to a common assignee.

However in each of the above identified patents, the injectors of the silicon nozzles therein are not provided with any means for indicating the presence or the amount of fuel flowing through the injector.

SUMMARY OF INVENTION

The present invention provides a fuel injector in which orificed silicon layers define a nozzle for fuel flow control and atomization and, in addition, include electrical fuel flow indicators. The indicators utilize the ability of silicon layers or wafers to incorporate electrical circuitry and control devices as is known in the integrated circuit art. The silicon layers incorporate electrical circuits and devices which respond to the flexing or cooling of at least one of the layers due to fluid flow to provide an indication of the presence and/or quantity of fuel flow. The layers may be closely spaced and provided with flow control and atomizing flow openings relative to fuel injection nozzles. Resistive strain bridges, capacitance indicating means and heated conductors are examples of flow indicating means that may be wholly or partially mounted in or on the silicon layers of the nozzle.

These and other features and advantages of the invention will be more fully understood from the following detailed description taken together with the accompanying drawings.

DETAIL DESCRIPTION:

The nozzle of the invention herein is one that is positioned in a fuel injector as is well known for supplying fuel to a motor vehicle engine. Details of the operation of the fuel injector, being well known, will not be described herein.

Figure 1:
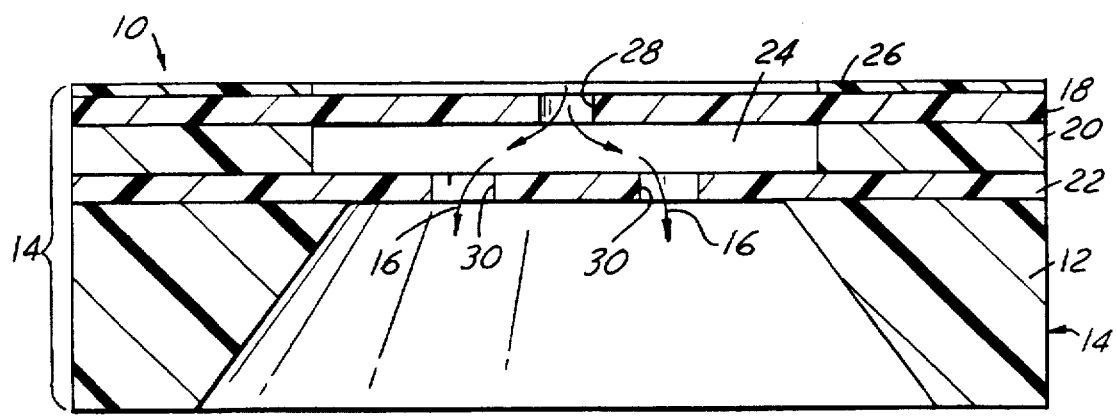
FIG. 1 is a cross-sectional view of one embodiment of the nozzle in a split stream configuration illustrating a silicon back-up washer.

Referring to FIG. 1, there is illustrated a nozzle 10 formed from a single silicon crystal with a 100 orientation including an integral back-up washer 12 together forming a unitary silicon structure 14. The flow of fluid is from the top of the figure to the bottom of the figure as shown by the arrows 16. The nozzle comprises a thin top layer 18, a spacer layer 20 and a thin bottom layer 22.

Figure 3:
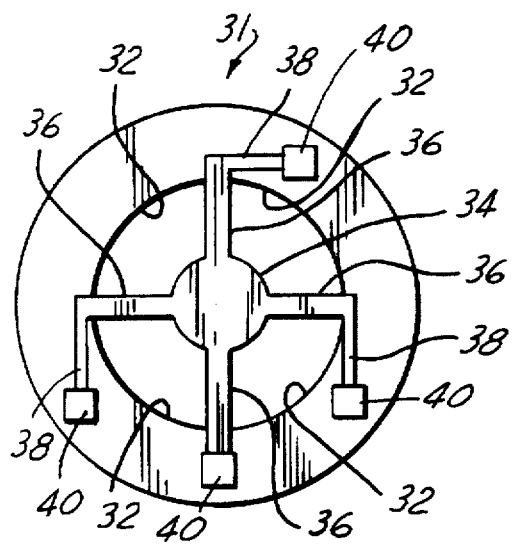
FIG. 3 is the top layer of either nozzle of FIG. 1 or FIG. 2.
Figure 4:
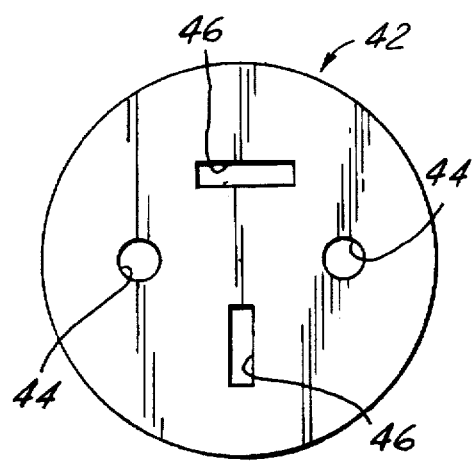
FIG. 4 is an alternate top layer of either nozzle of FIG. 1 or FIG. 2.

The thin top layer 18 may be doped, patterned and etched to form electrical circuitry or devices as desired. An example of such a layer 18 is illustrated in FIGS. 3 and 4. The spacer layer 20 is an epitaxial silicon layer grown or formed upon a P doped bottom layer 22 and functions, among other duties, to act as an electrical insulating layer between the top 18 and bottom 22 layers. The volume 24 between the top and bottom layers, is bulk etched to remove the central portion of the epitaxial silicon spacer layer 20 to leave open the volume between the two axially spaced layers 18 and 20 and forming the spacer layer around the edge of the nozzle 10. Since this is a nozzle 10 for indicating the presence or amount of fuel flow through the injector, one or more electrical leads 72, 74 (FIG. 6) are connected to the top 18 and/or the bottom 22 layers as will be shown hereinafter. In addition, an insulating layer 26 may partially cover the nozzle 10 for purposes evident in FIG. 6.

The bottom layer 22 is P doped to form an electrically resistive substrate. The spacer layer 20 is of epitaxial silicon which is grown or formed upon the P doped bottom layer. The top layer 18, in FIG. 1 has a central orifice 28, but as illustrated in any of the FIGS. 3 and 4, can have one or more orifices or a special pattern of orifices or openings depending upon the desired spray pattern of the fuel from the outlet orifice or orifices 30, 57. In any configuration, each layer may have an electrical lead connected thereto which is connected to an electrical fluid flow indicator 76, (FIG. 6) for the detection of the change in capacitance between the layers due to the impingement of fluid on the layers.

FIG. 3 illustrates a top layer 31 having a pattern formed by etching or micromachining to form four equally and angularly spaced arcuate openings 32. The forming of these openings creates a generally circular central area 34 connected by four bridges or beams 36 connecting the central area with the surrounding portions of layer. These bridges or beams 36 and associated portions 38 of the layer are N doped to provide a conductive pattern forming a strain bridge including the four bridges or beams 36 in a continuous pattern formed entirely on the layer. Attached to the pattern ending pads 40 are one or more electrical leads 72, 74. The strain bridge responds to variations in fluid pressure across the beams 36. Typically FIG. 3 is a top layer, but by suitable arrangement of the beams 36 and openings 32, the concept of FIG. 3 could be applied to any layer.

FIG. 4 illustrates an alternate top layer 42 having a pattern of holes 44 and slots 46 through which fluid passes to the bottom layer. This particular pattern is more suited to a capacitance measuring system. The fluid pressure against the layers causes an axially directed pressure variation which changes the spacing between the layers, hence a change in the capacitance. In this instance, electrical leads 72,74 (FIGS. 6) are connected from both layers to the electrical fluid flow indicator 76. An insulating layer 26 is formed around the nozzle 48 preventing electrical shorting through the valve body 52.

In the bottom layer 22 of FIG. 1, there are illustrated at least two spaced apart orifices 30 which operate to provide a split stream flow of fluid from the nozzle 10 and through the outlet of the back-up washer 12. When the upper layer 18 is configured like that shown in FIG. 3, the fluid flowing in the direction of the arrows 16, impinges on the central area 34 and the beams 36 causing a deflection which is capable of being measured. The measurement is correlated to the amount of fluid flow and by means of the electrical leads, the measurement information is supplied to a signal conditioner, not shown and then to an electronic control unit also not shown.

Fluid in the volume 24 is in turbulent flow as the fluid leaves the top layer 18 and flows through one or more orifices 30 in the bottom layer 22. Flow through the bottom layer 22 after passing through the top layer 18 and the volume 24 becomes atomized. It has been found that any sharp change in direction of the fluid causes disruption and break up of the flow.

Figure 2:
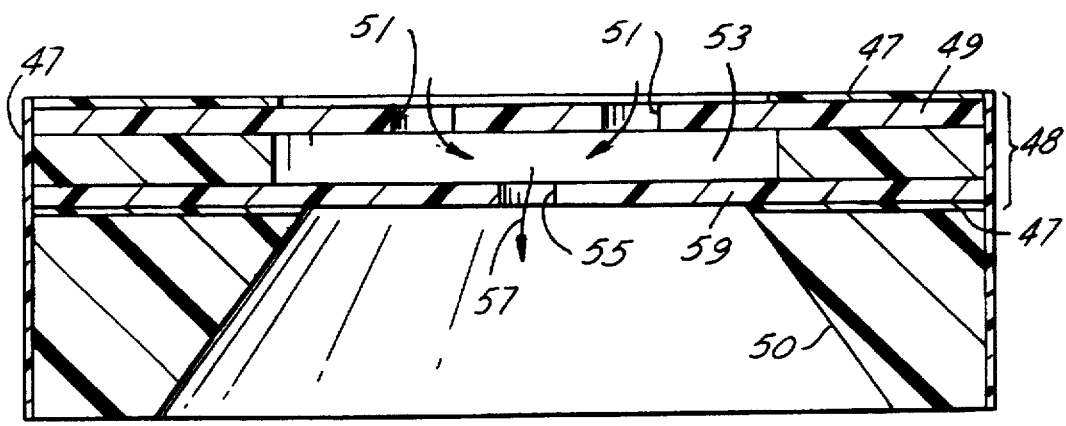
FIG. 2 is a cross-sectional view of another embodiment of the nozzle of FIG. 1 in a single stream configuration mounted on a steel back-up washer.

In FIG. 2, the nozzle 48 is a unitary structure mounted on a steel back-up washer 50 with the nozzle insulated from the back-up washer has a frustoconical cavity and. The back-up washer 12 or 50 in either FIG. 1 or 2a, is secured to the injector by means such as the crimping over 70 of the valve body 52 in FIG. 6. The top layer 49 is shown as having two openings 51 feeding fluid or fuel to the volume 53 and out a single orifice 55. The fluid or fuel flow in the direction of the arrows 57 functions to create a single stream.

Figure 5:
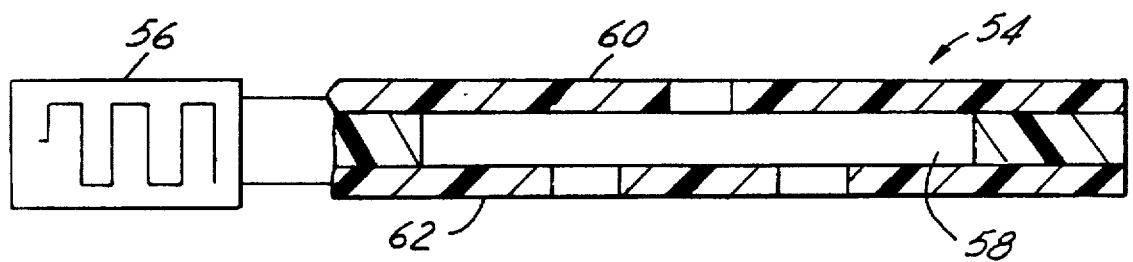
FIG. 5 is a schematic illustration using an electrostatic atomizing arrangement with the nozzle.

FIG. 5 schematically illustrates another variation in which the nozzle 54 is patterned with conductive surfaces on the upper and lower layers. These surfaces are then connected to an alternating current electrical source 56 that causes alternating attraction and repulsion forces between the surfaces that develops relative motion of the surfaces to break up and atomize the fluid passing through the volume 58 between the two layers 60, 62.

Figure 6:
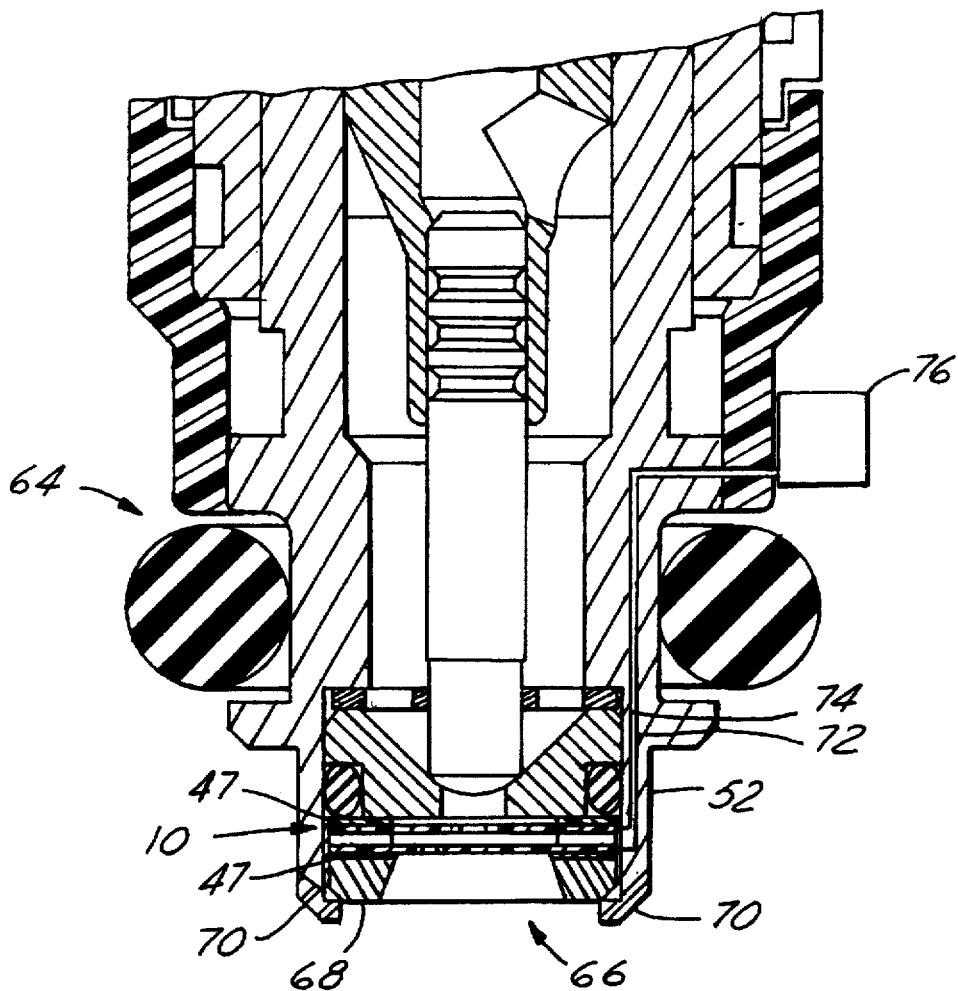
FIG. 6 is cross-sectional view of the nozzle end of an injector illustrating the nozzle in a capacitance measuring mode.

FIG. 6 shows the nozzle end 64 of an exemplary fuel injector embodiment. The injector includes a valve body 52 having an outlet end 66 on which is mounted a nozzle 10 or 48 which may be of the type illustrated in FIGS. 1 and 2. If desired, a separate carrier 68 may be used to support the nozzle or it may be directly mounted in the valve body 52. The carrier 68 or back-up washer 12,50 is secured to the injector by means such as the crimping over 70 of the valve body 52 or by means of laser welding, depending upon the materials of the respective parts. The nozzle is suitably insulated from the valve body 52 preventing any electrical shorting between the layers of the nozzle and the valve body.

The electrical circuitry contained in the silicon layers 18, 22 of the nozzle 10 is connected with appropriate conductors 72,74 in the carrier 68 or valve body 52 and from there to a suitable electrical fuel flow indicating device 76 or signal conditioner for the reading of the strain gage, in the case of the top layer 18, 31 being that illustrated in FIG. 3 or following the nozzle 42 illustrated in FIG. 4, for the measurement of the capacitive changes between the layers 49, 59. Taking any one of these measurements, and by proper electronic circuitry, an indication of flow or no flow; and indication of the rate of flow; or an indication of the volume of flow can be determined.

In addition, the layers may be connected as a hot film device so that as the fluid flow through one of the layers, the layer is cooled down from a predetermined temperature at a rate proportional to the amount of fluid flowing thereby.

What is claimed is:

1. A flow sensing fuel injector nozzle including:
    a first silicon flow control layer having at least one flow restricting orifice therethrough;
    a second silicon flow control layer axially spaced from said first layer and having at least one flow opening therethrough;
    retaining means fixing said layers in closely spaced relation and defining a flow passage between them for atomizing a fuel flowing under pressure through said orifice and flow opening; and
    a sensor of an electrical fuel flow indicator at least partially mounted on one of said layers for indicating a flow of fuel through said nozzle.

2. The nozzle as in claim 1 wherein said silicon layers are separated by an electrical insulating layer.

3. The nozzle as in claim 2 wherein said insulating layer is epitaxial silicon.

4. The nozzle as in claim 3 wherein said layers are formed of 100 orientation silicon.

5. The nozzle as in claim 1 wherein said sensor includes a strain bridge mounted on one of said flow control layers to detect axial deflections thereof in response to variations in pressure across said one of said flow control layers due to changes in the fuel flow rate.

6. The nozzle as in claim 5 wherein said flow indicator includes means for indicating the fuel flow rate in response to said axial deflections.

7. The nozzle as in claim 5 wherein said strain bridge is in said second flow control layer.

8. The nozzle as in claim 1 wherein said flow control layers are capable of accepting an electrical charge and said sensor includes means for measuring changes in capacitance between the layers caused by relative axial deflections of the layers in response to variations in pressure across the flow-restricting orifice due to changes in the fuel flow rate.

9. The nozzle as in claim 8 wherein said flow indicator includes means for indicating the fuel flow rate in response to said changes in capacitance.

10. The nozzle as in claim 1 wherein said sensor includes a heatable resistive conductor mounted on one of the flow control layers and cooled by fuel flow through the layers to vary the resistance of the conductor in response to changes in the fuel flow rate.

11. The nozzle as in claim 10 wherein said flow indicator includes means for indicating the fuel flow rate in response to said variations in resistance.

12. The nozzle as in claim 1 including an atomizer operative to apply an AC signal to at least one of the layers to resonate the plates by electrostatic attraction.

13. The nozzle as in claim 1 wherein said layers are supported by an integral back-up washer and form therewith a unitary silicon structure.

* * * * *